Dec. 6, 1966 J. C. EMERSON 3,290,448

ELECTRIC SIGNALLING SYSTEMS

Filed July 10, 1963 3 Sheets-Sheet 1

Inventor
J.C. EMERSON
By [signature]
Attorney

ELECTRIC SIGNALLING SYSTEMS

Inventor
J.C. EMERSON
By [signature]
Attorney

Inventor
J.C. EMERSON
By
Attorney

United States Patent Office 3,290,448

Patented Dec. 6, 1966

3,290,448
ELECTRIC SIGNALLING SYSTEMS

John Christopher Emerson, London, England, assignor to International Standard Electric Corporation, New York, N.Y., a corporation of Delaware Filed July 10, 1963, Ser. No. 294,125
Claims priority, application Great Britain, July 19, 1962, 27,782/62
4 Claims. (Cl. 179—84)

This invention relates to electric signalling systems and is applicable to telephone and telegraph systems utilising carrier channels or other unilateral devices inserted in an existing network designed for bilateral signalling.

In ordinary step-by-step junction signalling (without carrier) as used in many parts of the world today signalling is effected by opening and closing electrical circuits to provide a form of ON-OFF signalling. For example in telephone systems the operation of the subscriber's dial contacts makes and breaks a loop or circuit between the junction wires from the exchange. The current in the loop is therefore caused to operate relays in the exchange. The signals originated by the opening and closing of the calling subscriber's loop are repeated forward from relay to relay in the originating exchange, the junction and the terminating exchange. The reply of the called subscriber, indicated by the completion of his loop circuit, causes a signal representing "called subscriber has replied" to be repeated backwards through the system, and can be used, for instance, to initiate metering. The foregoing description is primarily directed to telephone systems utilising 2-wire junctions.

When a carrier channel replaces the 2-wire junction in a telephone system arrangements have to be made to repeat the forward and backward signals, and one method of doing this is to include an additional relay set at the called exchange to modify the relay set at the calling exchange. The carrier system is required to provide some form of ON-OFF signalling and the modified relay set in the calling exchange operates this instead of closing the junction loop. At the called exchange the additional relay set closes the loop to the incoming selector in response to the carrier system ON-OFF signalling. This will provide facilities for forward signalling and the reverse or backward signalling is dealt with in a similar manner, using the carrier return channel equipped with similar ON-OFF signalling. One of the drawbacks of utilising relays is that the completion of the circuit by the called subscriber involves the reversal of current flow in the subscriber's loop, and necessitates the use of polarized relays arranged to operate only on reverse current.

Whilst telephone systems can be adapted to utilise carrier channels in the manner described above difficulty arises when additional facilities have to be provided (such as Operator Hold, or Busy Flash), so that practically every new installation must have its own particular relay sets, and it is frequently found that one simple ON-OFF carrier signalling channel in each direction is insufficient.

According to the present invention there is provided an electric signalling system including a pair of stations interconnected by unilateral communication circuits, there being at least one such circuit in each direction, the output of each station being a current regulated to be a function of the differences of the input and output voltages and currents over the communication circuits connected to the station.

According to one aspect of the invention there is provided an electric signalling system including a pair of stations interconnected by unilateral communication circuits, there being at least one such circuit in each direction, means at each station for transmitting over each communication circuit signal being analogue or multi-valued function representations of the input voltage and current to the communication circuit, means at each station for receiving the signals and comparing them with the corresponding function of the output voltage and current of the communication circuit, and means for regulating the output current of each station whereby the latter is a function of the difference of the input and output voltage and current.

The invention will be better understood by reference to the following description of an embodiment of the invention taken in conjunction with the accompanying drawings wherein FIG. 1 is a diagram illustrating an ordinary step-by-step junction signalling system;

Figures 1, 7:
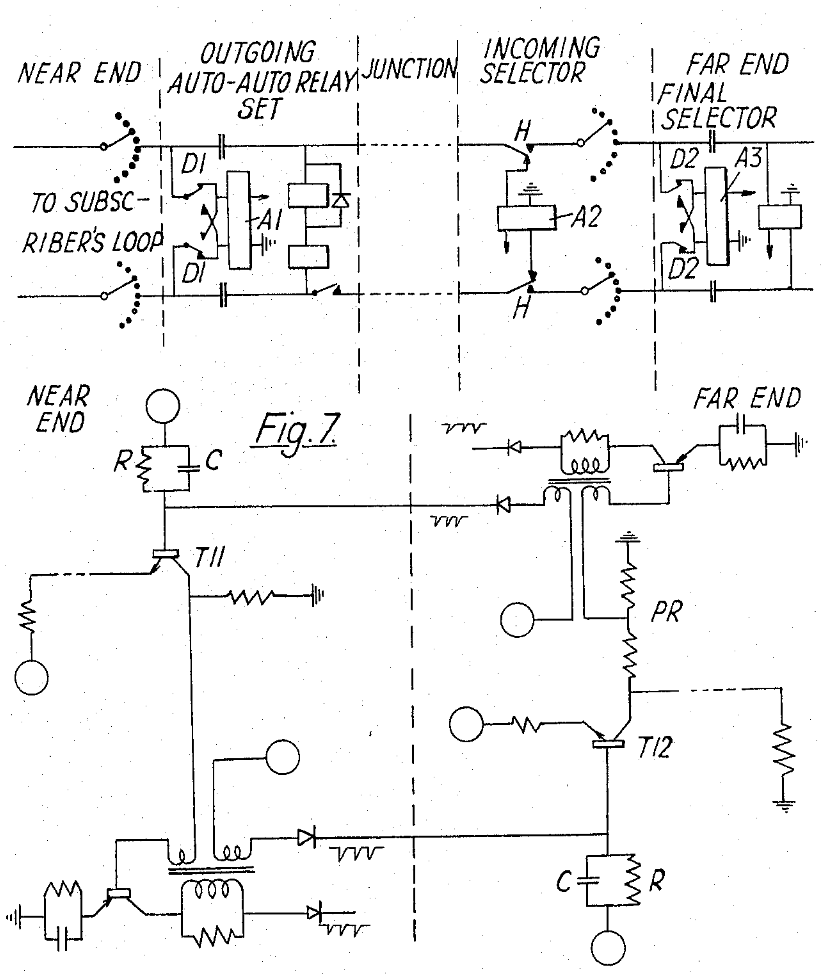
FIG. 7 illustrates an alternative analogue signalling system to that shown in FIG. 5.

The simplified circuit shown in FIG. 1 indicates a first selector connecting an outgoing auto-auto relay set at the near end of a junction and an incoming and final selector at the far end of the junction. The junction is thus permanently connected to an auto-auto relay set and an incoming selector.

In all the diagrams in which step-by-step junction signalling is depicted the connection to batteries is indicated by an arrow. Thus the A relay windings in FIG. 1 are connected between the negative terminal of a battery supply and earth.

In the outgoing auto-auto relay set of FIG. 1, battery and earth are connected through the windings of the relay A1 to feed current to the calling subscriber's loop. Relay A1 therefore is operated whenever the calling subscriber's telephone is "OFF-HOOK," and will also respond to dialling. Each time the subscriber's telephone contacts operate they complete a loop between the junction wires at the near end. Battery and earth are also applied to the junction at the far (incoming) end, through the windings of the selector relay A2, which will accordingly operate whenever the auto-auto relay set A1 operates. The signals originated by the opening and closing of the calling subscriber's loop are then repeated forward from relay A1 to relay A2. When, as a result of the dialling pulses, the incoming selector has been positioned on a suitable outlet, the relay H in its circuit extends the loop forward to the final selector, which is eventually positioned on the called subscriber's line terminals. The reply of the called subscriber, indicated by the completing of his loop circuit, causes relay D2 in the final selector to operate. The relay D2 contacts change over the A3 relay winding so that the direction of current flow is reversed. This current, received by the auto-auto relay set, causes its associated relay D1 to operate.

In this circuit the D relays are polarized relays arranged to operate only on a reverse current. Their contacts reverse the connections of the local A relay so that reverse current is fed backwards to the subscriber. Thus the signal representing "Called subscriber has replied" is repeated backwards through the system, and can be used, for instance, to initiate metering.

When a carrier channel replaces the 2-wire junction of FIG. 1, arrangements have to be made to repeat forward and backward signals over the carrier channel, and this is normally done by adding a relay set at the incoming end and modifying that at the outgoing end. The carrier system is required to provide some form of ON-OFF signalling and the outgoing end relay operates this instead of closing the loop. At the far end, the incoming relay set which has been added embodies another A relay which closes the loop to the incoming selector in response to the carrier system ON-OFF signalling. The reverse direction of signalling is dealt with in a similar manner, using the carrier return channel equipped with similar ON-OFF signalling. To do this the added incoming relay set must be provided with a polarized D relay to detect loop reversal, and the outgoing relay set must be modified so that its D relay is now operated from the carrier signalling channel.

Although there are no theoretical difficulties in the signalling system for carrier channels described above, there are a number of practical inconveniences. Firstly, the expense and trouble of providing extra relay sets at the far end, and accommodating them. Secondly, the need to modify the near end relay sets, or possibly to substitute others for them. The greatest inconvenience however is caused by the fact that the simple basic system as described above is modified from time to time and place to place, to provide additional facilities such as Operator Hold, or Busy Flash, so that practically every new installation must have its own particular relay sets. It is frequently found that one simple ON-OFF carrier signalling channel in each direction is insufficient.

Figure 2:
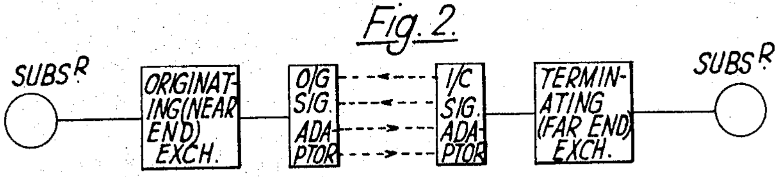
FIG. 2 is a block diagram of a telephone system utilising carrier channels.

FIG. 2 indicates a subscriber connected via an originating (near end) exchange to an outgoing signal adaptor, and another subscriber connected via a terminating (far end) exchange to an incoming signal adaptor. The two signal adaptors are connected by circuits (forming part of the carrier or other multiplex system) whose number and nature are unspecified except for the fact that they are unilateral, as indicated on FIG. 2 by arrows defining the direction of flow of information.

The conditions now required are simply that the currents flowing between the exchanges and adaptors be the same as those that would flow if the exchanges were directly connected. This statement disregards junction resistance, the effect of which is however taken into consideration in later calculations.

Figures 3, 6:
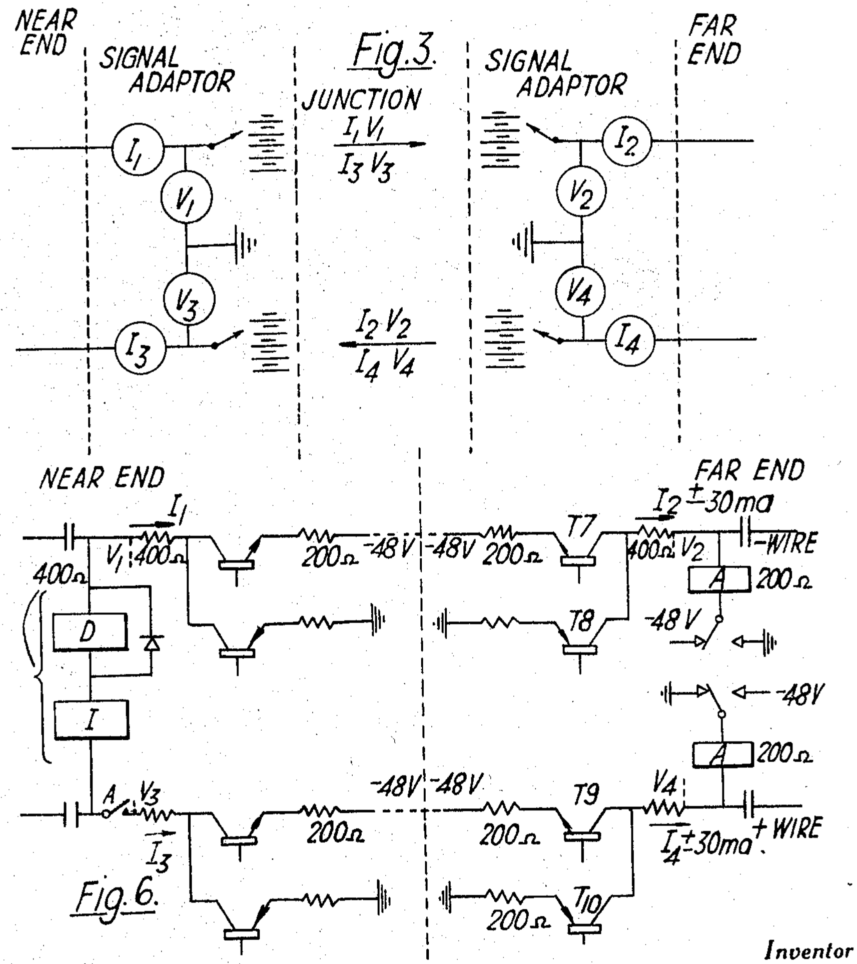
FIG. 3 illustrates a theoretical signalling system utilising carrier channels.
FIG. 6 illustrates the application of an analogue signalling system to step-by-step switching.

The circuit conditions which would arise in a system equivalent to a 2-wire junction with step-by-step type terminations are depicted in the theoretical signalling system utilising carrier channels in FIG. 3. In this system, each signal adaptor provides an adjustable low-resistance voltage source for each junction wire, together with current and voltage indicating devices. The indications of these devices are transmitted as analogue signals, through the carrier system, and the voltage sources are regulated until $I_1=I_2$, $V_1=V_2$, $I_3=I_4$, $V_3=V_4$, the voltage and current directions being as indicated in FIG. 3. When this regulation has been achieved the currents flowing must be exactly those which would flow if the two exchange equipments were directly connected.

The law or programme of voltage regulation for FIG. 3 is readily established if the exchange circuits are linear in their quiescent condition. In this case each wire between a signalling adaptor and the exchange equipment is considered as being connected to a fixed voltage via a positive resistance, when viewed from the adaptor. Using the arrows of FIG. 3 to define the positive directions of current, it will be seen that $I_1$ will always decrease as $V_1$ increases, while $I_2$ will always increase as $V_2$ increases. Thus if $V_1$ exceeds $V_2$, the regulator at the near end must be instructed to decrease $V_1$, while that at the far end increases $V_2$. This continues until $V_1=V_2$ whereupon $I_1$ and $I_2$ are compared. If $I_1$ exceeds $I_2$, both regulators increase their voltages, thus causing $I_1$ to decrease and $I_2$ to increase until equality is obtained. There is therefore an unambiguous programme which yields the desired result.

The most general form of analogue signalling system is obtained by transmitting $(aI_1+bV_1)$ forwards and $(cI_2+dV_2)$ backwards. In the system described above it has been assumed that analogue transmission of two signals in each direction is sufficient to relay all possible signalling conditions which can be sent or received over one physical wire. However, this number of analogue signals is not necessary and a simpler system can be provided in which only one analogue signal is required to be sent in each direction. In this case there are three possible systems which can be set up. In the first system only voltage indications are sent in each direction, that is a system where $a=c=0$. The second alternative system is that in which current indications are transmitted in both directions, i.e., $b=d=0$. The third system is one in which a current indication is transmitted in one direction and a voltage indication is transmitted in the other direction. In this system $b=c=0$.

In the case of the first system in which only voltage indications are transmitted in each direction, the governing equations are $$I_1R=n_1(V_1-V_2) \text{ and } I_2R=n_2(V_1-V_2)$$

$$I_1\left(R_1+\frac{R}{n_1}+\frac{n_2}{n_1}R_2\right)=E_1-E_2$$

$$I_2\left(\frac{n_1}{n_2}R_1+\frac{R}{n_2}+R_2\right)=E_1-E_2$$

where $n_1$ and $n_2$ are amplifier gains and R is a fixed resistance introduced to keep the equations dimensionally correct.

It was stated above that junction resistance had been neglected. In a practical case the exchange circuits of FIG. 2 are arranged to signal successfully over a range of junction wire resistances, which might be from zero to 750 ohms. In the both way voltage system described in the last paragraph, advantage can be taken of the fact that it is permissible to reproduce via the carrier system the signalling currents corresponding to finite junction resistances. This is done by putting $n_1=n_2=$unity, whereupon the bothway voltage system provides exactly the currents which would flow over a junction wire of resistance R.

Figure 4:
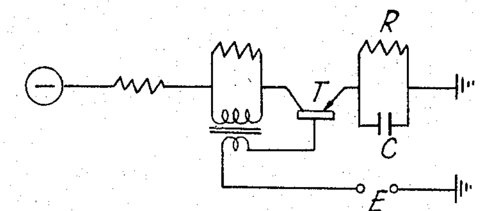
FIG. 4 is a circuit of an analogue signal pulse generator.

With an ordinary carrier system, the transmission of an analogue signal by means such as varying the amplitude of an outband sine wave is not attractive because of varying gain, unless a pilot signal is available to provide a reference level. A convenient analogue signal is that in which pulses of varying duration are transmitted, the duty cycle being interpreted as the value required. A circuit to achieve this is shown in FIG. 4, where a condenser C in the emitter circuit of the transistor T is charged while the transistor is ON and discharges through a parallel resistance R when the transistor is OFF. If the transistor base is connected to the reference potential E representing the quantity of which the analogue is wanted, and inductive feedback is provided to prevent the transistor remaining in a stable state, pulses are produced having a duty cycle dependent on the reference voltage. These pulses can then be transmitted to charge up a condenser-resistance combination of the same time constant as that in the analogue circut, and the average potential so obtained can be adjusted to a closely equal, or a fixed multiple of, the original.

The circuit of FIG. 4 may also be operated with a pulsed power supply, to provide an output in which pulse density, rather than pulse duty cycle, conveys the required information. This modification is especially applicable to pulse code modulation systems. Furthermore, two separate analogues may be conveyed by time division over a single signal channel, alternate pulses being distributed to each of the output circuits.

Figure 5:
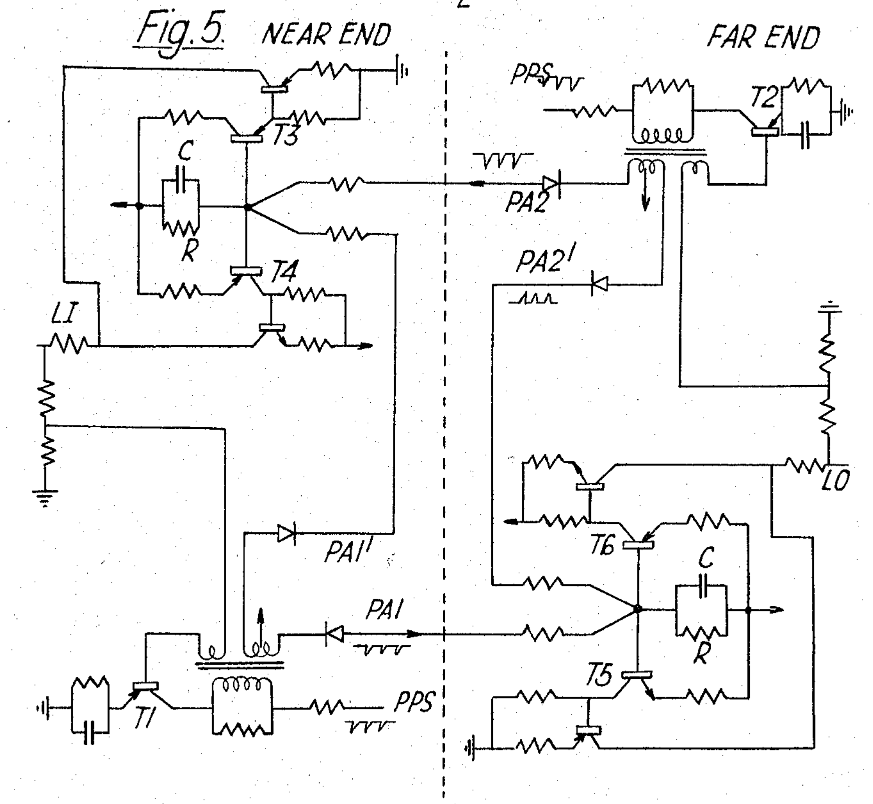
FIG. 5 illustrates an analogue signalling system for one junction wire.

FIG. 5 shows a basic transistor circuit which carries into effect a bothway voltage transmission system. One such circuit is required for each junction wire.

In this circuit a portion of the input voltage from the line LI is fed to the Transistor T1 which forms a pulse generator of the type shown in FIG. 4. The pulse generator is provided with a pulsed power supply PPS. Analogue pulses PA1 are derived from the pulse generator and transmitted in the forward direction to the RC network at the far-end exchange. A second set of pulses PA1', identical to PA1 but inverted, is also derived from the pulse generator and fed to the RC network in the near-end exchange. Similarly the pulse generator at the far end T2 produces voltage analogue pulses PA2 transmitted in the reverse direction and also local inverted reference pulses PA2'. Considering first the RC network in the near end exchange, this receives the distant voltage indicating pulses PA2 charging it negatively, and the local reference voltage indicating pulses PA1' charging it positively. If the net result is positive, transistor T3 is made to conduct and its amplified current is fed to the input line LI. If the net charge is negative, then transistor T4 (PNP) conducts and current is drawn from the input line LI. Similarly, the RC network at the far end exchange is charged by the negative pulses PA1 and the positive pulses PA2' and either transistor T5 or transistor T6 conducts and regulates the current flow to and from the outgoing line LO.

Feedback connections can be provided to ensure that in either case the current is held closely proportional to the voltage developed across the appropriate RC element.

The application of a bothway analogue signalling system to a standard Strowger step-by-step system is illustrated in FIG. 6, in which the circuit conditions are represented diagrammatically. The details of the associated relay operating sequence are the same as those described for FIG. 1. Since the system without junction multiplex will operate over junctions of up to 1,500 ohms loop inductance, relay operating currents as low as 21 ma. (43 volts applied to 2,300 ohms) will be satisfactory, but to allow a margin of safety and for some further junctions in the chain of connections, the working current has been made ±30 ma. maximum corresponding to an 800 ohm junction. This allows a maximum of 600 ohms in each leg (set by near-end loop condition), which has been arbitrarily divided into 400+200 ohms, the latter value implying a 6 volt swing at the transistor bases. When the near-end loop is closed, $V_1$ should be equal to −30 volts, $V_2$ should be equal to −42 volts, and $I_1$ and $I_2$ should both be equal to 30 ma. The circuits of the transistors T7 and T8 of FIG. 6 are therefore so adjusted that $$I_1=I_2 \text{ (ma.)}=2.5(V_1-V_2).$$

Similarly the transistors T9 and T10 are so adjusted that $I_3=I_4$ (ma.)$=2.5$ $(V_3-V_4)$.

To avoid confusion the normal convention for step-by-step practice is followed, in which the two speech conductors are named − wire and + wire, the former being placed above the latter in the circuit drawings. The potentials of these wires when the circuit is normal are − and + in accordance with their names, but during operation their potentials may be reversed.

*Dialing*

Dialing by a subscriber has the effect of opening the near-end loop for a succession of periods of approximately 66 ms. When the loop was closed the voltage $V_1$ was −30 volts and $V_2$ was −42 volts, and $I_1$ and $I_2$ were both 30 ma. When the loop is opened $V_1$ rises to −48 volts. At the far end transistor T8 is turned OFF and transistor T7 conducts. In fact transistor T7 saturates because the A relay windings are inductive and the current in them cannot change instantaneously. For this reason a current is initially drawn through T7 with its collector acting as an emitter, $V_2$ temporarily falling below −48 volts in potential. The current decay in the A relay therefore corresponds to a 600 ohm short circuit instead of the open circuit which would have taken place if the exchange circuits had been directly connected. This is due to the analogue signalling system having passed beyond its linear operation limits. Quicker release of the relay A would be secured by applying a more negative voltage to T7, but in practice a compromise is secured between the speed of release and the high reverse voltage across T8 due to the inductive kick of the relay.

*Zero current*

Both for dialling and release conditions zero current should be faithfully transmitted. For this reason the circuit properties should be so arranged that T3 and T4 in FIG. 5 both remain OFF for a finite but small value of $(V_1-V_2)$.

*Analogue transmission*

There are two signals to be transmitted in either direction (assuming the equivalent of a 2-wire junction is to be obtained) and this is achieved by interleaving of the analogue pulses. This system is especially suited to pulse code modulation systems, which can also provide the necessary signalling speeds without difficulty.

*Speech conditions*

The signal adaptor circuit provides an output current which is, in theory, a controlled function of $V_1-V_2$, and therefore must be furnished from a high impedance source. The shunting effect on speech voltages due to the signal adaptors should therefore be zero. In practice this is true for FIG. 6 at the far end, but the 400 ohm near-end resistances imply that the transistors are just saturated when passing 30 ma. which will give the effect of a 1200 ohm shunt on the speech transmission. This can either be accepted, with a compensating gain in the multiplex system, or could be avoided by reducing the value of the resistance.

*Busying from far end*

This is a desirable feature for a multiplex system but is not provided by the standard step-by-step circuits. A suitable signal condition for the introduction of this feature is *−ve* potential on both far-end wires, detected by the fall in mean potential of the near-end wires.

FIG. 7 shows an alternative transistor circuit which carries into effect an analogue signalling system in which a voltage indication is transmitted in one direction and a current indication is transmitted in the opposite direction. One such circuit is required for each junction wire. The governing equations for such a system are $$V_2=n_2R(I_1-I_2) \quad \text{and} \quad I_1R=n_1(V_1-V_2)$$

where $n_1$ and $n_2$ are amplifier gains and R is a fixture resistance introduced to keep the equations dimensionally correct. The second equation implies that the supply at the near end is an adjustable current source rather than an adjustable voltage source.

The circuit equations are:

$$I_1R_1=E_1-V_1 \quad \text{and} \quad I_2R_2=V_2-E_2$$

from which the following equations can be readily obtained $$I_1\left(R_1+R_2+\frac{R_1}{n_1}+\frac{R_2}{n_2}+\frac{R_1R_2}{n_2R}\right)=E_1-E_2+\frac{E_1R_2}{n_2R}$$

$$I_2\left(R_1+R_2+\frac{R}{n_1}+\frac{R_2}{n_1n_2}+\frac{R_1R_2}{n_2R}\right)=E_1-E_2-E_2\left(\frac{R_1}{n_2R}+\frac{1}{n_1n_2}\right)$$

The above equations approach closely to the desired result i.e.

$$I_1=I_2=\frac{E_1-E_2}{R_1+R_2}$$

when $n_1$ and $n_2$ are sufficiently large.

In this circuit a portion of the output voltage at the far end is fed to a pulse generator of the type shown in FIG. 4 by a potentiometer PR. The resulting pulses (repeated via the carrier system) charge an R–C combination at the near end, and the near end voltage is held equal to the voltage so developed by transistor T11, which is coupled as an emitter follower. A resistance in the collector circuit of transistor T11 carries the near end current. The voltage across this resistor regulates the pulses from the near end pulse generator, which are conveyed to the far end to charge another R–C combination. The voltage so developed is translated into output current by transistor T12 which acts as a feedback amplifier.

The output currents of this circuit are unidirectional, and to overcome this disadvantage constant current devices may be connected to the input and output lines.

It is to be understood that the foregoing description of specific examples of this invention is not to be considered as a limitation on its scope.

What I claim is:

1. An electric signalling system including a pair of stations interconnected by unilateral communication circuits, there being at least one such circuit in each direction, means at each station for transmitting over each communication circuit to the other station signals which are analogue function representations of the input voltage and current received by the transmitting station from other associated equipment, means at each station for receiving the signals transmitted over said communication circuits and comparing them with the corresponding functions of the output vlotage and current of the receiving station, and means for regulating the output current of each station until the latter is a function of the difference of the input and output voltage and current.

2. An electric signalling system according to claim 1 in which each station is adapted to transmit a single signal being an analogue representation of the input voltage only to the communication circuit at the station.

3. An electric signalling system according to claim 1 in which the analogue signal transmitted by one station is a representation of the input voltage only to the communication circuit at that station, and the analogue signal transmitted by the other station is a representation of the input current only to the communication circuit at the other station.

4. An electric signalling system according to claim 1 in which each analogue signal comprises a series of pulses of varying duration, the duty cycle of the series being interpreted as the value required.

References Cited by the Examiner

UNITED STATES PATENTS 2,816,962 12/1957 Stanley ______________ 179—84

KATHLEEN H. CLAFFY, *Primary Examiner.*

H. ZELLER, *Assistant Examiner.*